July 28, 1953     J. A. KAY     2,646,869
APPARATUS FOR TRANSFERRING AND CONVEYING ARTICLES
Filed Sept. 10, 1948
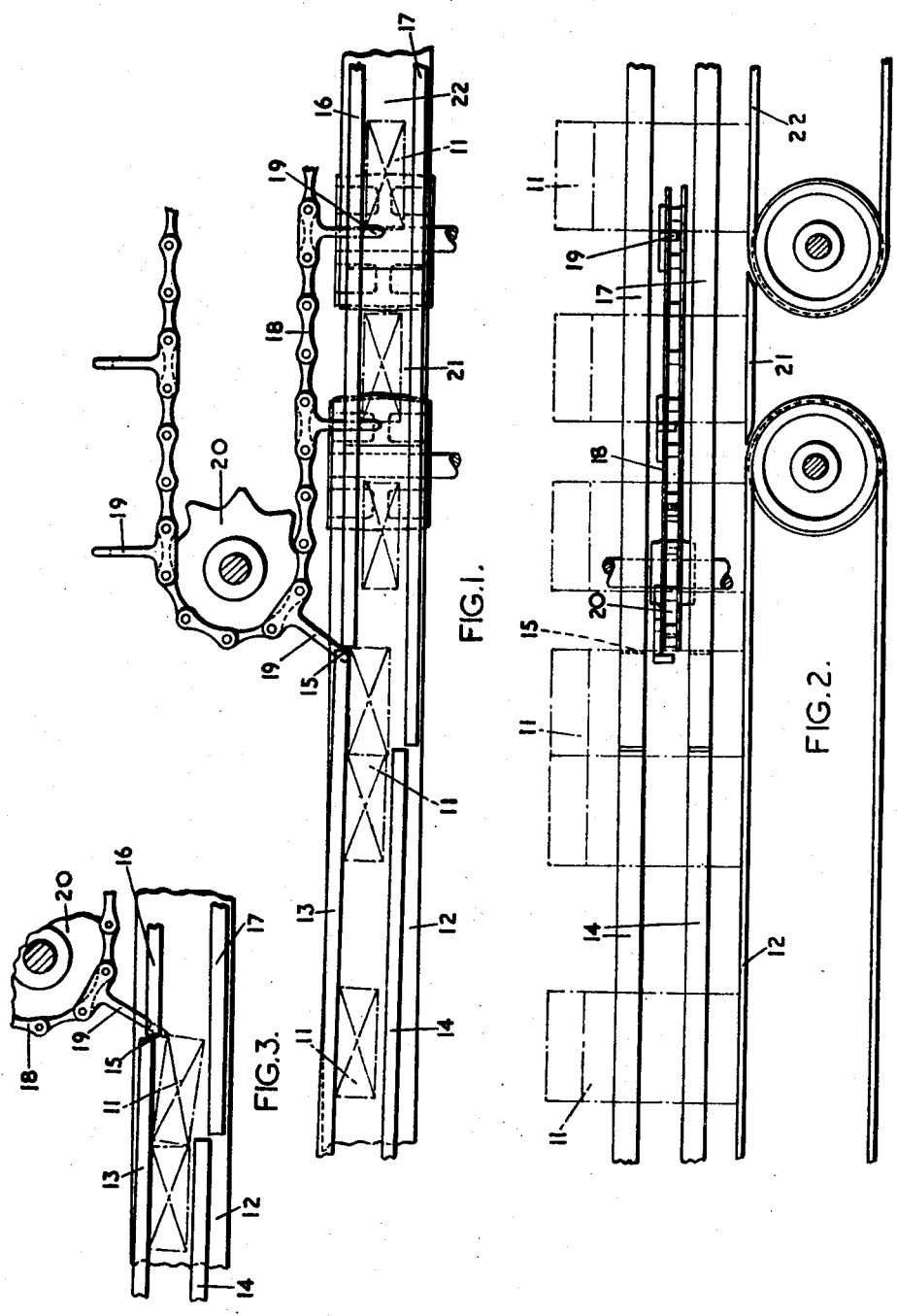
INVENTOR:
J. A. KAY.
BY:
Munn, Liddy & Glaccum
ATTORNEYS.

Patented July 28, 1953

2,646,869

UNITED STATES PATENT OFFICE 2,646,869

APPARATUS FOR TRANSFERRING AND CONVEYING ARTICLES

James Arthur Kay, Gainsborough, England, assignor to Rose Brothers (Gainsborough) Limited, Gainsborough, England, a British company Application September 10, 1948, Serial No. 48,568
In Great Britain September 15, 1947

2 Claims. (Cl. 198—20)

This invention relates to apparatus for transferring and conveying articles, the apparatus being of the kind in which articles, for example, cartons, or other block-shaped articles, are fed by a conveyor to a transfer station at which the articles are transferred to a further conveyor of the kind, for example, a comprising spaced pushing elements which forward the articles in definite spaced relationship to each other.

According to the invention, there is provided an apparatus of the above kind, comprising a feed conveyor, a fixed stop protruding into the path of the articles on said feed conveyor so as to hold the articles against movement under the influence of said feed conveyor after the leading article strikes said stop, and a rotary transfer member moving continuously and adapted to engage each article in turn so as to move it clear of said fixed stop and allow it to be forwarded by said feed conveyor.

The apparatus preferably includes a delivery conveyor of the kind comprising a series of spaced pushing elements secured to a chain, the chain being driven by a chain wheel mounted for rotation about an axis transverse to the path of movement of the articles and to their general plane of movement. In such a case, the transfer member may be constituted by each of the pushing elements in turn as they move round the circumference of the chain wheel, the chain wheel being so disposed that each pushing element in turn moves into the path of the articles on the feed conveyor in the vicinity of the fixed stop so as to strike the leading article held by the fixed stop and move it clear of the fixed stop.

The apparatus according to the invention may be used in any case where articles are required to be delivered from one machine and fed to another in a definite timed relationship. Thus, for example, the apparatus according to the invention may be used for feeding empty cartons to a carton-filling machine, or for feeding filled cartons to a carton-closing machine; or again, the apparatus may be used for feeding completed cartons to a labelling or wrapping machine.

By way of example, the invention will now be described in greater detail with reference to the accompanying drawings, as applied to an apparatus for feeding filled cartons to a carton-closing machine.

In the drawings;

Figure 1 is a plan view of part of a carton-closing apparatus,

Figure 2 is a side elevation of the apparatus shown in Figure 1, and

Figure 3 is a detail of the apparatus shown in Figure 1, illustrating the operation of the transfer member.

Referring to Figures 1 and 2, filled cartons 11 are conveyed towards a transfer station by a horizontal belt conveyor 12. During such movement, the cartons 11 are guided by guide rails 13 and 14 which are inclined with respect to the path of movement of the cartons 11 so that the conveyor belt 12 continuously urges the cartons 11 to one side of the conveyor, in this case towards the guide rails 13. The guide rails 13 terminate adjacent a fixed stop 15 projecting into the path of movement of the cartons 11 on the conveyor 12 so as to arrest their forward motion. The fixed stop 15 is constituted by the adjacent ends of guide rails 16 which are slightly offset in relation to the guide rails 13, and co-operate with further guide rails 17 to guide the cartons 11 during their further movement.

Arranged adjacent the feed conveyor 12 at the transfer station is a delivery conveyor comprising a chain 18 provided with a series of spaced pushing elements 19, the chain 18 being driven by a chain wheel 20 arranged for rotation about a vertical axis so disposed that, during the movement of the pushing elements 19 around the chain wheel 20, each in turn moves into the path of movement of the cartons 11 in the vicinity of the fixed stop 15 so as to strike the leading carton 11 and free it from engagement with the fixed stop 15 so that it can once more move forward under the influence of the conveyor 12 which continues beyond the fixed stop 15 to a position somewhat beyond the axis of the chain wheel 20. In order to allow of the transverse movement of the cartons 11 under the influence of the pushing elements 19, the guide rails 14 fall short of the fixed stop 15 by an amount approximating to the length of a carton, such distance being made up by a corresponding projection of the guide rails 17.

The conveyor 12 delivers the freed cartons in succession to a stationary platform 21 which acts as a brake and brings the cartons to rest. The stationary platform 21 leads to a belt conveyor 22 moving in the same direction as the feed conveyor 12 and disposed immediately below the adjacent lap of the chain 18 so as to form part of the delivery conveyor.

It will be seen that as the pushing elements 19 of the chain conveyor move round their chain wheel 20, and pass through the space between the guides 13 and 16, each in turn strikes the leading edge of the leading carton 11 and causes it to move transversely of its normal path of movement until it is clear of the fixed step 15 (see Figure 3). The peripheral speed of the chain 18 is somewhat higher than that of the conveyor 12 so that as soon as the pusher 19 has moved the carton 11 clear of the stop 15, it moves on ahead of the carton 11. The freed carton 11 is then moved forward by the feed conveyor 12 as mentioned above to the stationary platform 21 where it remains until the next succeeding pushing element 19 moves up behind it (after freeing the next succeeding carton 11 from the fixed stop 15) and pushes it across the stationary platform 21 and on to the belt conveyor 22 which has a peripheral speed equal to that of the pushing elements 19 so as to avoid sliding contact between the bases of the carton 11 and the apparatus which would otherwise occur if they were merely pushed along a stationary channel by the pushing elements 19. The chain conveyor is arranged to operate in timed relationship with the carton closing machine (not shown) so that each pushing element 19 delivers a carton 11 to the machine at the appropriate time.

I claim:

1. Apparatus for transferring and conveying articles comprising a feed conveyor, a fixed stop protruding into the path of the articles on said feed conveyor so as to hold the articles against movement under the influence of said feed conveyor after the leading article strikes said stop, an endless delivery conveyor arranged adjacent said feed conveyor to travel over a path at least a portion of which is rectilinear, said delivery conveyor being arranged to travel at a higher rate than that of the feed conveyor and provided with a series of spaced pushing elements each adapted in turn firstly to engage the leading article as the pushing element approaches the rectilinear path so as to constitute a transfer member for moving the leading article laterally clear of the fixed stop so as to allow it to be forwarded by said feed conveyor, and then to move forwardly past the leading article along the rectilinear path into engagement with the preceding article forwarded by the feed conveyor so as to move that article towards a delivery station.

2. Apparatus as in claim 1, wherein the delivery conveyor comprises an endless chain to which the pushing elements are attached, the chain being driven by a chain wheel mounted for rotation about an axis transverse to the general plane of movement of the articles.

JAMES ARTHUR KAY.

References Cited in the file of this patent

UNITED STATES PATENTS

| Number | Name | Date |
|---|---|---|
| 1,998,842 | Moseley et al. | Apr. 23, 1935 |
| 2,153,039 | Darling | Apr. 4, 1939 |
| 2,245,659 | Everett | June 17, 1941 |